United States Patent
Eriksson et al.

(10) Patent No.: US 8,909,255 B1
(45) Date of Patent: Dec. 9, 2014

(54) REVERSE GEOCODER

(71) Applicant: Google Inc., Mountain View, CA (US)

(72) Inventors: Göran Ingemar Eriksson, Wädenswil (CH); Nils Richard Ekwall, Stäfa (CH)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/772,243

(22) Filed: Feb. 20, 2013

Related U.S. Application Data

(60) Provisional application No. 61/601,492, filed on Feb. 21, 2012.

(51) Int. Cl.
*H04W 24/00* (2009.01)
*H04W 4/02* (2009.01)

(52) U.S. Cl.
CPC ........................................ *H04W 4/02* (2013.01)
USPC ........ 455/456.3; 455/448; 455/437; 455/450; 455/422.1; 455/552.1; 455/434; 455/435

(58) Field of Classification Search
USPC .............. 455/434, 435.1, 458, 448, 437, 150, 455/422.1, 552.1, 456.3, 456.5, 561, 562.1; 370/280, 281, 335, 331, 342
See application file for complete search history.

(56) References Cited

U.S. PATENT DOCUMENTS

| | | | | |
|---|---|---|---|---|
| 6,745,115 B1 * | 6/2004 | Chen et al. | | 701/9 |
| 6,751,626 B2 * | 6/2004 | Brown et al. | | 1/1 |
| 7,107,038 B2 * | 9/2006 | Fitch et al. | | 455/404.2 |
| 7,953,548 B2 * | 5/2011 | Vengroff et al. | | 701/425 |
| 2002/0052674 A1 * | 5/2002 | Chang et al. | | 700/300 |
| 2005/0043037 A1 * | 2/2005 | Ioppe et al. | | 455/456.1 |
| 2009/0005968 A1 * | 1/2009 | Vengroff et al. | | 701/202 |
| 2009/0228281 A1 * | 9/2009 | Singleton et al. | | 704/275 |
| 2012/0316878 A1 * | 12/2012 | Singleton et al. | | 704/251 |
| 2014/0195234 A1 * | 7/2014 | Singleton et al. | | 704/246 |

* cited by examiner

*Primary Examiner* — Joseph Arevalo
(74) *Attorney, Agent, or Firm* — McDermott Will & Emery LLP

(57) ABSTRACT

Aspect of the subject technology relate to a computer-implemented method for identifying geographic features related to a location lookup point. In some implementations, the method includes steps for receiving location information for a location look-up point, generating a plurality of search cells containing the location look-up point, wherein the plurality of search cells correspond with a respective plurality of hierarchical map cells and using the plurality of search cells to identify at least one geographic feature that is associated with at least one of the plurality of search cells. In certain aspects, the method can further include steps for providing at least one geographic feature to a user for display. Systems and computer-readable media for generating a geographic feature index are also provided.

19 Claims, 6 Drawing Sheets

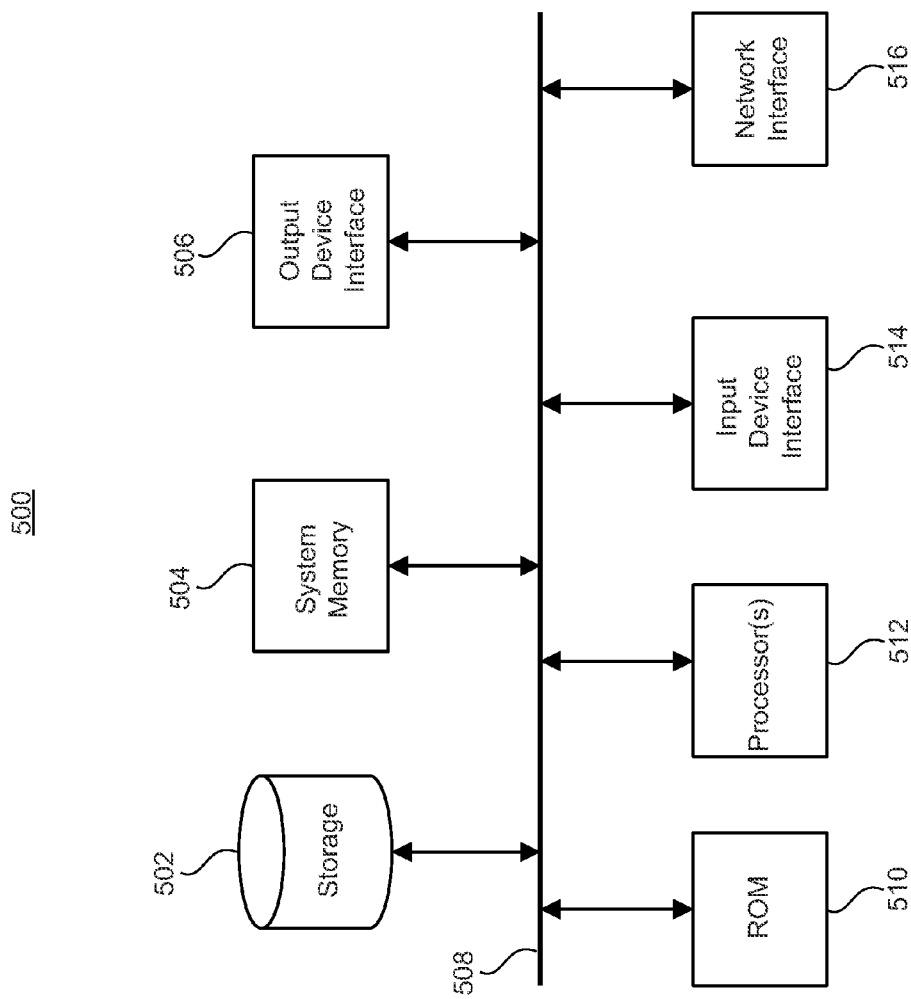

REVERSE GEOCODER

This application claims the benefit of U.S. Provisional Application No. 61/601,492, filed Feb. 21, 2012, entitled "REVERSE GEOCODER," which is incorporated herein by reference.

BACKGROUND

Maps and global positioning system (GPS) devices are frequently used to provide situational awareness to users. Conventional maps and electronic GPS navigation devices can provide names and labels for certain map features, such as the names of natural geographic features, man-made structures and/or geo-political borders, etc.

SUMMARY

The disclosed subject matter relates to a computer-implemented method for identifying geographic features related to a location lookup point. In certain aspects, the method includes steps for receiving location information for a location look-up point, generating a plurality of search cells containing the location look-up point, wherein the plurality of search cells correspond with a respective plurality of hierarchical map cells and using the plurality of search cells to identify at least one geographic feature that is associated with at least one of the plurality of search cells. In some implementations the method can further include steps for providing the at least one geographic feature to a user for display.

In another aspect, the disclosed subject matter relates to a system for identifying geographic features related to a location look-up point. In some implementations, the system can include one or more processors and a computer-readable medium comprising instructions stored therein, which when executed by the processors, cause the processors to perform operations including receiving location information for a location look-up point, generating a plurality of search cells containing the location look-up point, wherein the plurality of search cells correspond with a respective plurality of hierarchical map cells and using the plurality of search cells to identify at least one geographic feature that is associated with at least one of the plurality of search cells. In some implementations, the processors can be configured to perform steps for scoring the at least one geographic feature based on an amount of area overlap between the at least one geographic feature and the at least one of the plurality of search cells.

In another aspect, the subject technology relates to a computer-implemented method for generating a geographic feature index, the method including steps for receiving a plurality of geographic features each having a geographic coverage area, determining, for each of the geographic features, one or more map cells that, when taken together, approximate the geographic coverage area of the geographic feature and determining, for each of the cells, a list of one or more of the plurality of geographic features that include the map cell in its geographic coverage area. In some implementations, the method further includes steps for scoring each of the one or more of the plurality of geographic features in the list based on an amount of area overlap between the one or more of the plurality of geographic features and the map cell in its geographic coverage area.

In yet another aspect, the subject technology relates to a system for generating a geographic feature index, the system including one or more processors and a computer-readable medium comprising instructions stored therein, which when executed by the processors, cause the processors to perform operations including receiving a plurality of geographic features each having a geographic coverage area, determining, for each of the geographic features, one or more map cells that, when taken together, approximate the geographic coverage area of the geographic feature, determining, for each of the cells, a list of one or more of the plurality of geographic features that include the map cell in its geographic coverage area and scoring each of the one or more of the plurality of geographic features in the list based on an amount of area overlap between the one or more of the plurality of geographic features and the map cell in its geographic coverage area.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 5 illustrates an example of an electronic system with which certain aspects of the subject technology can be implemented.

DETAILED DESCRIPTION

Figure 1:
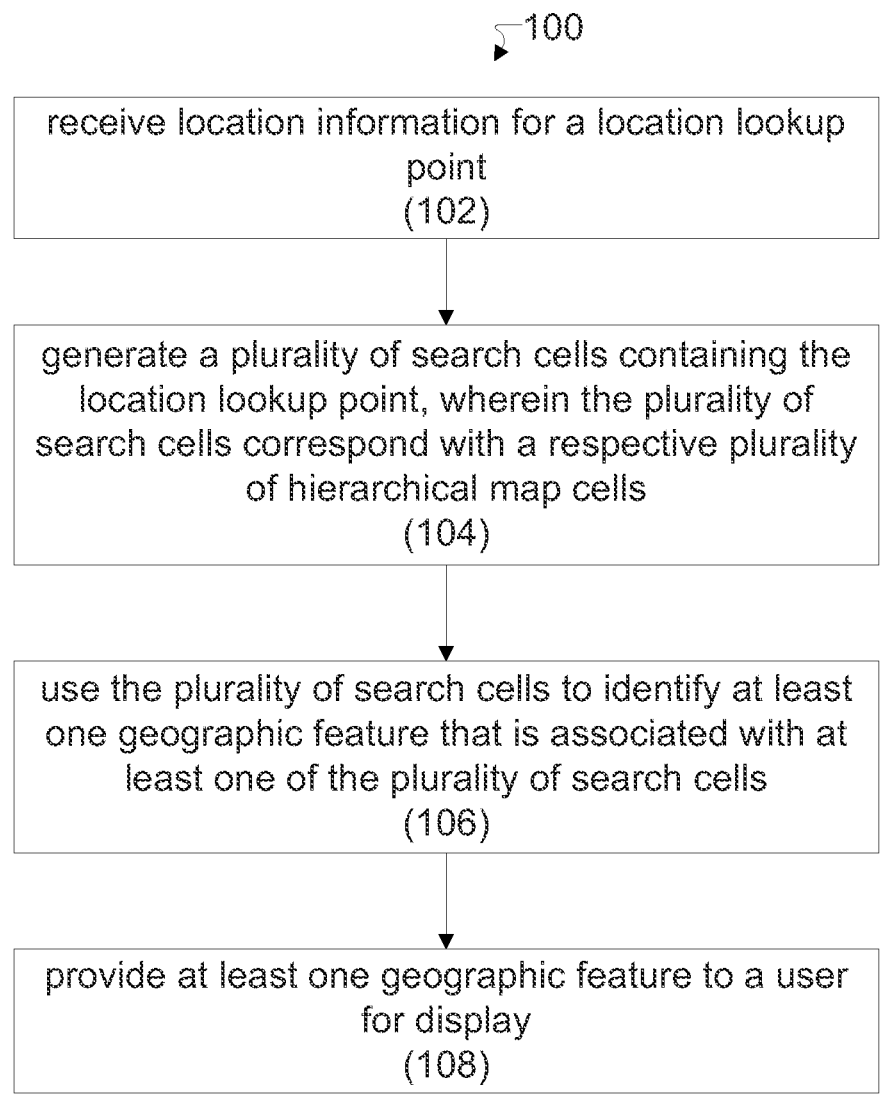
FIG. 1 illustrates a flow diagram of an example method for identifying a geographic feature associated with a location lookup point.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides a method and system for identifying geographic features with respect to a location lookup point (e.g., a latitude and longitude value). The geographic features can comprise any feature identifiable on a map. However, in some implementations the geographic features will include only features having a polygonal area. In some examples, geographic features may include, but are not limited to, geo-political entities (e.g., neighborhoods, boroughs, cities, states, etc.), natural boundary areas (e.g., lakes, mountains, shorelines, etc.) and/or man-made structures such as building and roads, etc.

The location lookup point can correspond to any geographic location on a map. In some examples, the location lookup point will identify the physical location of a user. The location lookup point may be provided directly by, or inferred using, any suitable location information. Location information can comprise any information bearing on the likelihood of a physical position of a user. For example, location information may comprise location coordinates corresponding to a user location provided by a global positioning system (GPS) device, such as a GPS chip in a smart phone or mobile computing device.

The location lookup point is used to generate a plurality of search cells, each encompassing the location lookup point, for use in determining what geographic features are associated with the location lookup point. Each of the plurality of search cells can include a different amount of geographic area and will correspond with a single map cell among a plurality of hierarchical map cells that cover the map. In generating the plurality of search cells, each subsequently generated search cell may contain a geographic area that is larger than the preceding search cell. By way of example, the first cell that is generated among the plurality of search cells can be the smallest possible search cell (corresponding to the smallest map cell) having one or more associated geographic features.

A determination of which geographic features are relevant to a particular location lookup point can be made through the use of one or more preprocessed indices. Specifically, a preprocessed index (e.g., a first index) can be generated that identifies a relationship between geographic features and each of a plurality of hierarchical map cells that contain those features. Additionally, a preprocessed index (e.g., a second index) can be generated that identifies a relationship between map cells and features. Using the index, relevant geographic features can by identified (for each of the plurality of search cells), by determining, for each search cell, the set of all geographic features that are associated (e.g., overlap with) the search cell.

The index will first map geographic features to one or more of the plurality of hierarchical map cells. Specifically, the mapping between geographic features and map cells will be performed by determining, for each geographic feature, the set of hierarchical map cells that approximate the geographic "coverage area" of the geographic feature. As used herein, geographic coverage area can refer to a bounded geographic area (or map area) that approximates (or encompasses) a geographic feature in size and shape. Thus, the geographic coverage area for a geographic feature can approximate the shape and orientation of a map region covered by the geographic feature.

In some implementations, geographic features can be approximated by favoring a fewer number of hierarchical map cells (e.g., using the minimum number of map cells that can accurately approximate the geometry of the geographic feature). By way of example, the approximation may favor the use of larger map cells as compared to the use of the multiple map cells that comprise the larger map cells in the map cell hierarchy.

The determination as to what map cells can be used to approximate a particular geographic feature can depend on a percentage of area overlap between a particular map cell and the geographic feature e.g., the percentage of the map cell contained within the boundary area of the geographic feature. An overlap threshold may be used to determine which map cells can be used to approximate a particular geographic feature. For example, a sixty percent overlap threshold may be required before a geographic feature can be associated with a particular map cell. Thus, map cells not having at least a sixty percent area overlap with a particular geographic feature may be disregarded (e.g., not added to the index). Depending on implementation, the percentage of area overlap between a geographic feature and an associated map cell may be indicated in the index. In certain aspects, minimizing the number of map cells used to approximate a particular geographic feature (e.g., disregarding map cells having a partial overlap) may help increase the speed of the reverse geocoding process, as further described below.

In certain aspects, the index will further contain a mapping between each hierarchical map cell and a set of geographic features corresponding to that particular cell. For example, a map cell may be mapped to a particular geographic feature (or a feature identifier associated with the geographic feature) if the map cell is determined to be, at least partially, contained within the geographic boundary area of the geographic feature. Associations between map cells and geographic features can also be based on minimum thresholds, for example, of an overlap area shared by a particular map cell and a particular geographic feature. In some implementations, a threshold for associating map cells with geographic features may be larger than the threshold that is used to associate geographic features with map cells.

In practice, after a location lookup point is identified, a plurality of search cells (each having a corresponding hierarchical map cell) will be generated which each contain the location lookup point. Subsequently, using the index, the set of geographic features corresponding to each of the plurality of search cells are identified. After the set of geographic features for each of the plurality of hierarchical map cells are identified, one or more of the geographic features can be displayed to a user. In certain aspects, the determination of which of geographic features should be provided to the user is based on a scoring of the geographic features to determine a ranking of relevance with respect to the user and/or the reference location coordinate, as described in further detail, below.

FIG. 1 illustrates a flow diagram of an example method 100 for identifying one or more geographic features associated with a location lookup point. The method 100 begins with step 102 in which location information for a location lookup point is received, for example, by a processor-based device. The location information can comprise any type of information indicating a location on a map. By way of example, location information can comprise information received from a user operated device, such as a mobile device including global positioning system (GPS) chip. In some examples the location information will comprise map location coordinates, such as longitude and latitude coordinate information and can be received from a user operated device, such as a mobile computing device, e.g., a smart phone, a tablet computing device or a mobile computer, etc. Thus, in some implementations the location information will identify a location lookup point that approximates the physical location of the user on a map.

In step 104, a plurality of search cells are generated which contain the location lookup point. In certain aspects, the plurality of search cells will correspond to a respective plurality of hierarchical map cells. In some implementations, each of the plurality of search cells are a different size (e.g., enclose different geographic coverage areas as compared to the other search cells) and correspond to map cells of similar size and placement. The process of generating the plurality of search cells can begin with generating a search cell having the smallest relative area compared to the other of the plurality of search cells. In some examples, the first and smallest search cell generated will correspond in size, and placement, to the smallest available map cell for the geographic region surrounding the location lookup point. In other examples, the first and smallest search cell generated will correspond in size, and placement, to the smallest available map cell for which one or more geographic features are associated.

In step 106, the plurality of search cells generated in step 104 are used to identify at least one geographic feature associated with at least one of the plurality of search cells. One or more geographic features (e.g., a set of geographic features) may be identified for each search cell through use of an index that identifies a mapping between each search cell and a set of associated geographic features. In some implementations, a search cell may be determined to be associated with a particular geographic feature if the particular geographic feature at least partially includes the search cell in its geographic coverage area.

Depending on the implementation, the association between a particular geographic feature and a particular search cell may depend on a percentage of area overlap between the geographic feature and the search cell, e.g., an amount of the area of the search cell that is contained within the geographic coverage area of the geographic feature. Overlap information indicating an amount of area overlap between each geographic feature and each associated search cell and/or map cell can be stored in the index.

In step 108, at least one geographic feature is provided to a user for display. In some implementations, the user is provided with only geographic feature information pertaining to geographic features that are relevant to the user and/or the location lookup point corresponding to the user's location on the map. A determination of which geographic features are relevant (and thus provided to the user) can be based on a "scoring" of the various geographic features which overlap with each search cell containing the location lookup point.

The process of scoring may use any information about the location lookup point and/or the geographic features associated with the search cells. In some implementations, geographic features having complete coverage of a particular search cell are assigned a score of a higher rank i.e., preferred to geographic features sharing only a fractional area overlap with the search cell. A "coverage score" between a geographic feature and an overlapping search cell and can be calculated (wherein minimal coverage scores are more highly ranked) using the relationship given by:

$$\text{coverage score} = (\text{square root of search cell area} * (1.0 - \text{covering fraction})) \quad (1)$$

Figure 2:
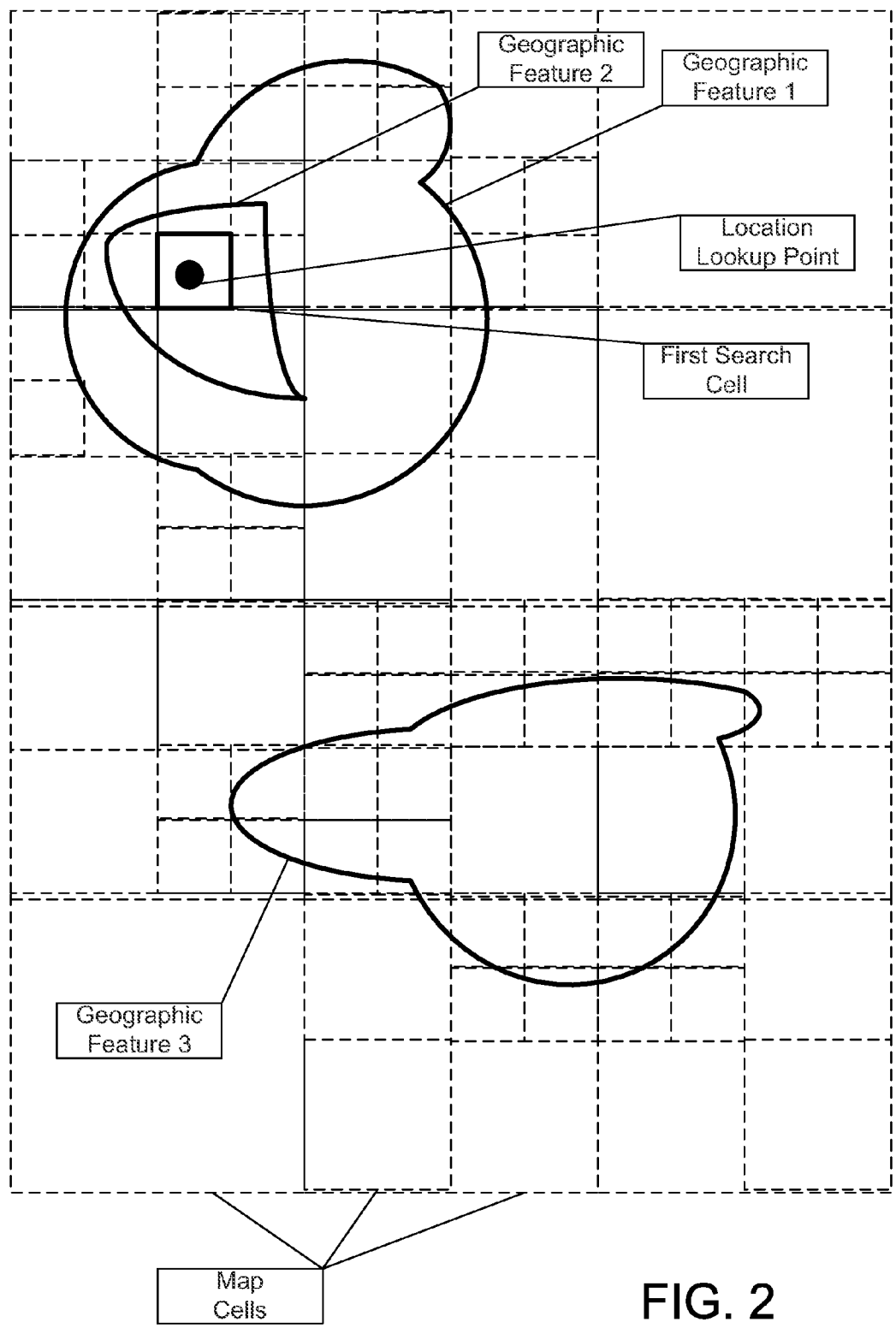
FIG. 2 graphically illustrates an example of a relationship between map cells, a location lookup point, a first search cell and multiple geographic features, according to some aspects of the subject disclosure.

FIG. 2 graphically illustrates an example of a relationship between a plurality of hierarchical map cells, a location lookup point, a first search cell and various geographic features. Specifically, FIG. 2 illustrates the plurality of hierarchical map cells that cover the map region depicted in FIG. 2, including the geographic features contained therein (e.g., Geographic Features 1-3). FIG. 2 further depicts the location lookup point contained within Geographic Features 2 and 3.

In some implementations, the entire map area is covered by one or more hierarchical map cells that are related in a hierarchy of "levels," wherein each map cell is contained within a bounded area of at least one map cell from each of the higher (larger) levels. Thus, the map cell is contained within the boundaries of at least one map cell from each higher level. The number of map cell levels used to cover a particular map region, as well as the size (e.g., the particular levels) of map cells, can vary depending on the region.

Figure 3A:
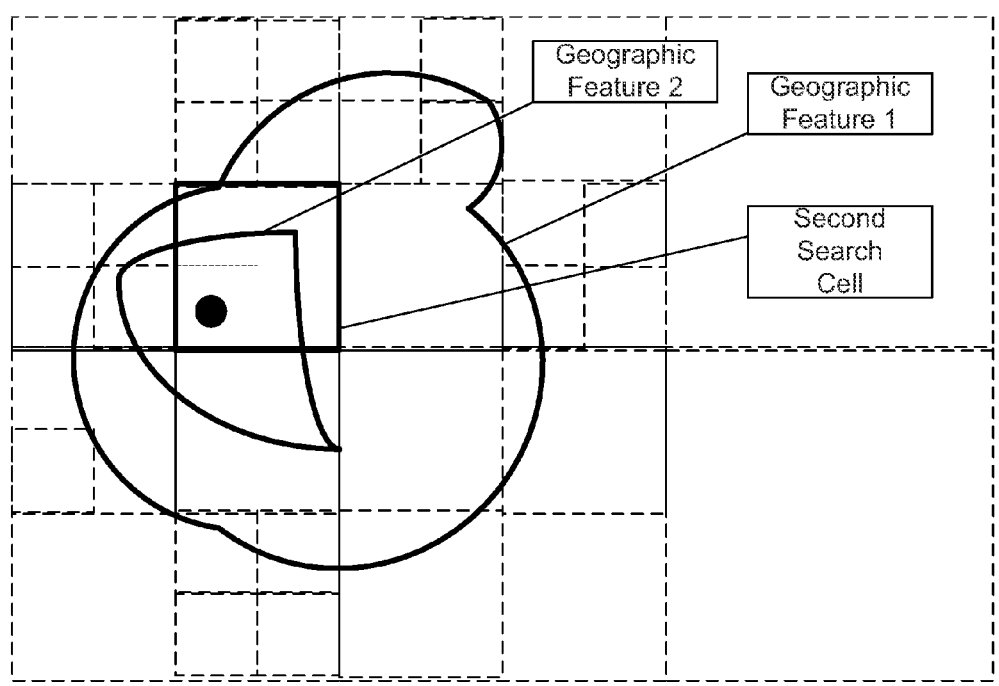
FIG. 3A graphically illustrates an example of a second search cell containing the location lookup point of FIG. 2.
Figure 3B:
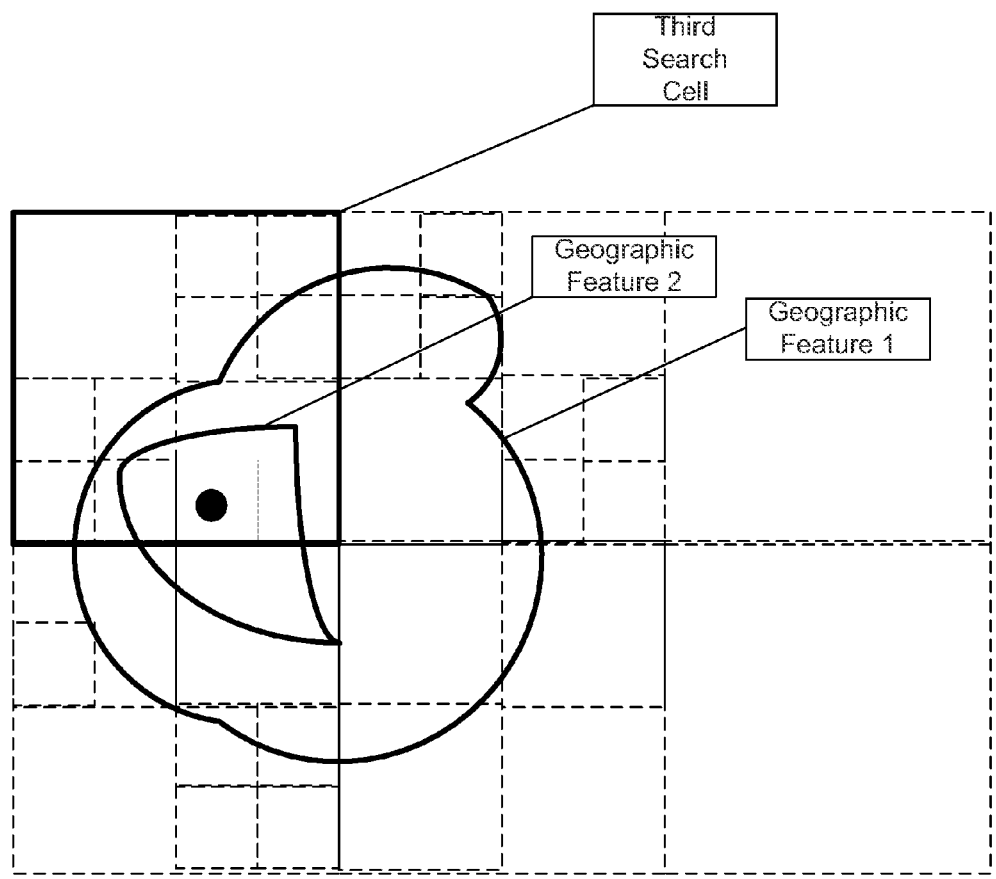
FIG. 3B graphically illustrates an example of a third search cell containing the location lookup point of FIG. 2.

In the example beginning with the illustration of FIG. 2, the map cell containing the location lookup point in FIG. 2 (corresponding to the First Search Cell), is contained within a larger map cell (e.g., a map cell of a higher "level"), as shown in FIG. 3A, which corresponds to the Second Search Cell. Similarly, the map cell of FIG. 3A corresponding to a Second Search Cell, is contained within a yet larger map cell (corresponding to a Third Search Cell), as depicted in FIG. 3B.

Each geographic feature can be approximated using one or more of the map cells. Depending on the polygonal shape of a particular geographic feature and the level of map cells available for a particular region, different sized map cells (i.e., map cells of different levels) may be used to approximate the shape of a geographic feature. By way of example, the shape of Geographic Feature 2 may be approximated using the map cell corresponding to the First Search Cell in FIG. 2, which is entirely contained within the coverage area of Geographic Feature 2. Depending on implementation, one or more of the surrounding map cells may also be used to approximate the shape of Geographic Feature 2. The determination as to whether a particular map cell is included in the set of map cells used to approximate a particular geographic feature can depend on the amount of overlap between the geographic feature and the particular map cell. Additionally, in making an approximation of a geographic feature with adjacent map cells, configurations which minimize the number of map cells used in the approximation may be preferred over approximations requiring a greater number of map cells.

A preprocessed index can be used to map the relationship between each geographic feature and the plurality of map cells used to approximate the geographic feature. Thus, each geographic feature may be correlated with one or more map cells from among the plurality of hierarchical map cells covering the entire map. Furthermore, the index may also map a relationship between each of the hierarchical map cells and the associated geographic features. That is, for each map cell, the index may indicate a set of geographic features that at least partially contain that map cell in a respective coverage area of the geographic feature.

As illustrated in the example beginning in FIG. 2, a first search cell is generated containing the location lookup point. The first search cell corresponds to a smallest map cell for the map region containing the location lookup point. Subsequently, the second search cell and the third search cell are generated, as depicted in FIGS. 3A and 3B. As discussed above, each generated search cell corresponds to one of the plurality of hierarchical map cells. For each generated search cell, a list of geographic features associated with the search cell is determined, for example, using the index, as described above.

After the set of geographic features associated with each search cell has been determined, one or more of the geographic features associated with one or more of the search cells may be provided to the user. In certain aspects, a determination as to which geographic features should be provided to the user is based on a relevance between each geographic feature and the location lookup point associated with the user's position. By way of example, a scoring process may be used to determine for each geographic feature, an amount of area overlap between the geographic feature and one or more of the search cells containing the location lookup point.

Figure 4:
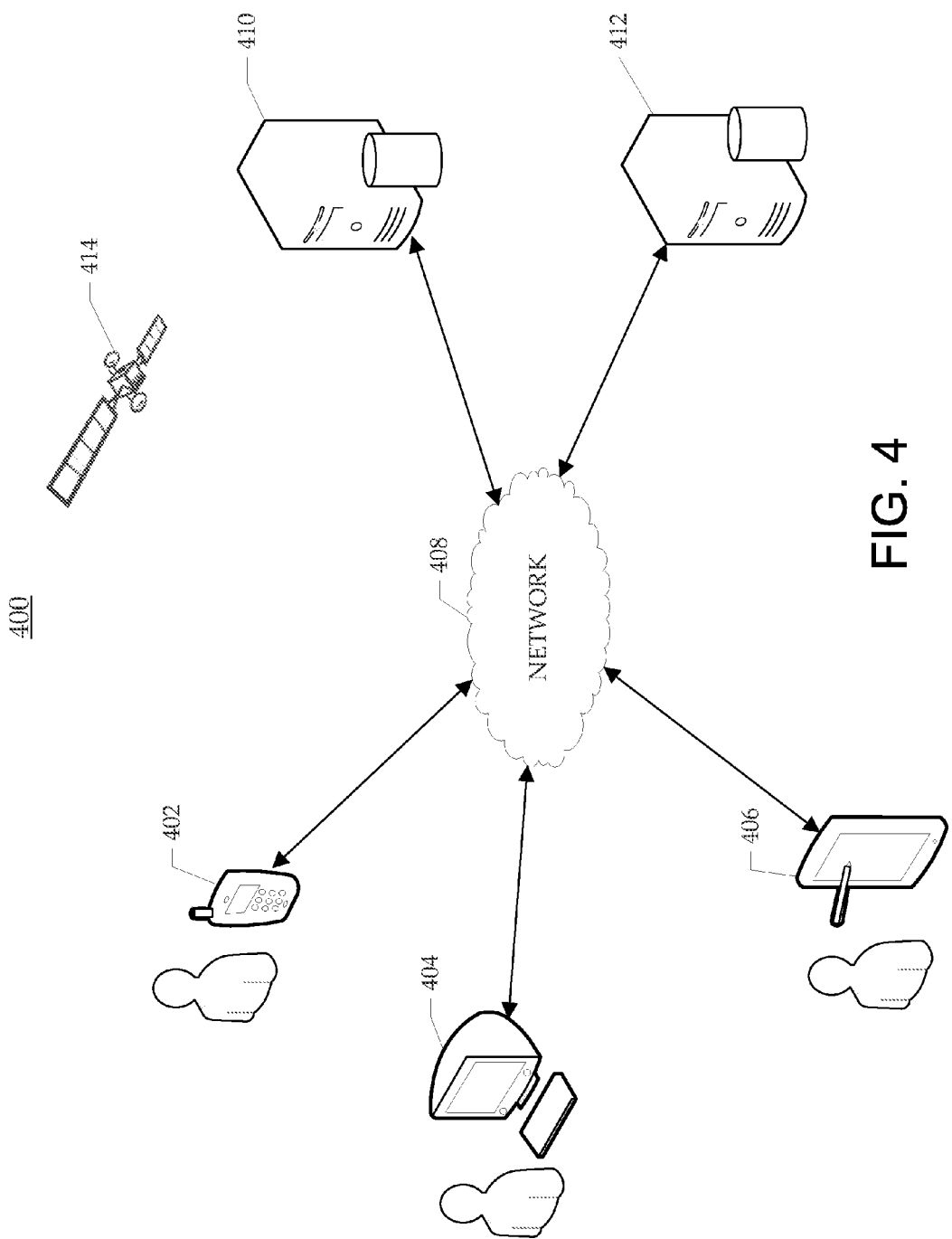
FIG. 4 conceptually illustrates a network system with which some aspects of the subject technology can be implemented.

FIG. 4 conceptually illustrates network system 400 with which some aspects of the subject technology can be implemented. Specifically, network system 400 comprises user devices 402, 404 and 406, network 408, first server 410, second server 412 and GPS satellite 414. As illustrated, user devices 402, 404 and 406 are communicatively connected to first server 410 and second server 412 via network 408. Although network system 400 is shown to include only three user devices (402, 404, 406) and two servers (e.g., first server 410 and second server 412), any number of user devices and servers could be communicatively connected to network 408, and used to implement one or more of the process steps of the subject technology. In certain implementations, one or more of user devices 402, 404 and/or 406 may be configured to receive a GPS signal from one or more GPS satellites, e.g., GPS satellite 414.

One or more of the process steps of the subject technology may be carried out by one or more of user devices 402, 404, 406 and/or first server 410 and second server 412. By way of example, user device 402 may provide location information to first server 410 including a location a location lookup point for a user of user device 402.

After receiving the location information and determining the location lookup point, first server 410 may then generate a plurality of search cells containing the location lookup point and use the search cells to identify a set of geographic features associated with at least one of the search cells. The determination as to which geographic features are associated with a particular search cell can depend on an amount of area overlap between the geographic feature and the search cell. For example, each geographic feature may be "scored" based on an amount of area overlap between the geographic feature and at least one of the plurality of search cells. Based on the scoring, a determination can be made as to which of the geographic features should be provided to a user for display.

It is understood that any of the steps of the subject disclosure may be performed using one or more computing devices, such as, first server 410 and/or second server 412, e.g., through communication over network 408.

FIG. 5 illustrates an example of an electronic system 500 with which certain aspects of the subject technology can be implemented. Electronic system 500 can be a single computing device such as a server (e.g., first server 410 and/or second server 412), discussed above. Electronic system 500 can include one or more user device connected to network 408 (e.g. the user devices 402, 404 and/or 406), discussed above. In some implementations, electronic system 500 can be operated alone or together with one or more other electronic systems e.g., as part of a cluster or a network of computers.

As illustrated, electronic system 500 comprises storage 502, system memory 504, output device interface 506, system bus 508, ROM 510, one or more processor(s) 512, input device interface 514 and network interface 516. In some aspects, system bus 508 collectively represents all system, peripheral, and chipset buses that communicatively connect the numerous internal devices of electronic system 500. For instance, system bus 508 communicatively connects processor(s) 512 with ROM 510, system memory 504, output device interface 506 and permanent storage device 502.

Processor(s) 512 can be configured to retrieve instructions to execute (and data to process) in order to execute the steps of the subject disclosure. Depending on implementation, processor(s) 512 can be a single processor or a multi-core processor. Additionally, processor(s) 512 can include one or more graphics processing units (GPUs) and/or global-positioning chips (GPS chips) or devices.

ROM 510 stores static data and instructions that are used by processor(s) 512 and other modules of electronic system 500. Similarly, processor(s) 512 can comprise one or more memory locations such as a CPU cache or processor in memory (PIM), etc. Storage device 502 can be a read-and-write memory device. In some aspects, storage device 502 can be a non-volatile memory unit that stores instructions and data even when electronic system 500 is without power. Some implementations of the subject disclosure can use a mass-storage device (such as solid state, magnetic or optical storage devices) e.g., a permanent storage device 502.

Other implementations can use one or more a removable storage devices (e.g., magnetic or solid state drives) such as permanent storage device 502. Although the system memory can be either volatile or non-volatile, in some examples system memory 504 is a volatile read-and-write memory, such as a random access memory. System memory 504 can store some of the instructions and data that the processor needs at runtime.

The processes of the subject disclosure can be stored in system memory 504, permanent storage device 502, ROM 510 and/or one or more memory locations embedded within processor(s) 512. From these various memory units, processor(s) 512 retrieve instructions to execute and data to process in order to execute the processes of some implementations of the instant disclosure.

For example, processor(s) 512 can be configured to generate one or more indexes relating geographic features to map cells. In some implementations, processor(s) 512 can be configured to receive a plurality of geographic features each having a geographic coverage area and determine, for each of the geographic features, one or more map cells that, when taken together, approximate the geographic coverage area of the geographic feature. Additionally, in certain implementations processor(s) 512 can be configured to determine, for each of the cells, a list of one or more of the plurality of geographic features that include the map cell in its geographic coverage area. As such, processor(s) 512 can correlate geographic features to map cells, for example, in a first index. As well as map cells to geographic features, for example in a second index.

In some aspects, processor(s) 512 may be further configured to perform scoring for geographic features based on an amount of area overlap between the geographic features and the map cell in its geographic coverage area. Because different map cells can share a different amount of area overlap with different geographic features, the relationship between geographic features/map cell pairs can vary. For example, for a geographic feature/map cell pair sharing a relatively large area of overlap, the scoring may be relatively high. Alternatively, a geographic feature that barely overlaps a particular map cell may receive a relatively low scoring. In some instances, inclusion of a particular geographic feature/map cell pair in an index can require that the pair exceed a specific scoring threshold.

Additionally, in some implementations, only geographic features that exceed a particular scoring threshold may be provided to a user, for example, in the context of a map display.

Bus 508 also connects to input device interface 514 and output device interface 506. Input device interface 514 enables a user to communicate information and select commands to electronic system 500. Input devices used with input device interface 514 can include, for example, alphanumeric keyboards and pointing devices (also called "cursor control devices") and/or wireless devices such as wireless keyboards, wireless pointing devices, etc.

Finally, as shown in FIG. 5, bus 508 also communicatively couples electronic system 500 to a network (not shown) through network interface 516. It should be understood that network interface 516 can be either wired, optical or wireless and may include one or more antennas and transceivers. In this manner, electronic system 500 can be a part of a network of computers, such as a local area network ("LAN"), a wide area network ("WAN"), or a network of networks, such as the Internet (e.g., network 408, as discussed above).

The methods of the subject disclosure can be carried out by electronic system 500. In some aspects, instructions for performing one or more of the method steps of the present disclosure are stored on one or more memory devices such as storage 502 and/or system memory 504.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an location information requests) to a client device (e.g., for purposes of determining pedestrian location information). Data generated at the client device can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

It is understood that the specific order or hierarchy of steps disclosed herein is exemplify some implementations of the subject technology. However, depending on design preference, it is understood that the specific order or hierarchy of steps in the processes can be rearranged. For example, some of the steps may be performed simultaneously. As such, the accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for identifying geographic features related to a location lookup point, comprising:
   receiving location information for a location look-up point;
   generating a plurality of search cells containing the location look-up point, wherein the plurality of search cells correspond with a respective plurality of hierarchical map cells;
   using the plurality of search cells to identify at least one geographic feature that is associated with at least one of the plurality of search cells;
   scoring the at least one geographic feature based on an amount of area overlap between the at least one geographic feature and the at least one of the plurality of search cells, the score comprising a coverage score based on a search cell area and a covering fraction; and
   providing the at least one geographic feature to a user for display based on the scoring of the at least one geographic feature.

2. The computer-implemented method of claim 1, wherein the at least one geographic feature has a geographic coverage area that includes the at least one of the plurality of search cells.

3. The computer-implemented method of claim 1, wherein each of the plurality of search cells covers a different amount of geographic area that includes the location look-up point.

4. The computer-implemented method of claim 1, further comprising:
   using two or more search cells, corresponding with hierarchical map cells of different levels, to identify two or more political features that are related at different hierarchical levels.

5. A system for identifying geographic features related to a location look-up point, the system comprising:
   one or more processors; and
   a computer-readable medium comprising instructions stored therein, which when executed by the processors, cause the processors to perform operations comprising:
      receiving location information for a location look-up point;
      generating a plurality of search cells containing the location look-up point, wherein the plurality of search cells correspond with a respective plurality of hierarchical map cells;
      using the plurality of search cells to identify at least one geographic feature that is associated with at least one of the plurality of search cells; and
      scoring the at least one geographic feature based on an amount of area overlap between the at least one geographic feature and the at least one of the plurality of search cells, the score comprising a coverage score based on a search cell area and a covering fraction.

6. The system of claim 5, wherein scoring the at least one geographic feature further comprises:
   identifying one or more geographic feature having a score above a predetermined threshold; and
   providing the one or more geographic feature to a user.

7. The system of claim 5, wherein the at least one geographic feature has a geographic coverage area that includes the at least one of the plurality of search cells.

8. The system of claim 5, wherein each of the plurality of search cells covers a different amount of geographic area that includes the location look-up point.

9. The system of claim 5, further comprising:
   using two or more search cells, corresponding with hierarchical map cells of different levels, to identify two or more political features that are related at different hierarchical levels.

10. A computer-implemented method for generating a geographic feature index, the method comprising:
    receiving a plurality of geographic features each having a geographic coverage area;
    determining, for each of the geographic features, one or more map cells that, when taken together, approximate the geographic coverage area of the geographic feature;
    determining, for each of the cells, a list of one or more of the plurality of geographic features that include the map cell in its geographic coverage area; and
    scoring each of the one or more of the plurality of geographic features in the list based on an amount of area overlap between the one or more of the plurality of geographic features and the map cell in its geographic coverage area, the score comprising a coverage score based on a search cell area and a covering fraction.

11. The computer-implemented method of claim 10, further comprising:
    generating a first index associating each of the plurality of geographic features with the one or more map cells that approximate the geographic coverage area of the geographic feature.

12. The computer-implemented method of claim 10, further comprising:
    generating a second index associating the one or more map cells with at least one of the geographic features in the list based on the score associated with the at least one of the plurality of geographic features.

13. The computer-implemented method of claim 12, further comprising
    providing at least one of the plurality of geographic features to a user if the score of the at least one of the plurality of geographic features exceeds a predetermined threshold.

14. The computer-implemented method of claim 10, further comprising:
    using two or more search cells, corresponding with hierarchical map cells of different levels, to identify two or more political features that are related at different hierarchical levels.

15. A system for generating a geographic feature index, the system comprising:
    one or more processors; and
    a computer-readable medium comprising instructions stored therein, which when executed by the processors, cause the processors to perform operations comprising:
       receiving a plurality of geographic features each having a geographic coverage area;
       determining, for each of the geographic features, one or more map cells that, when taken together, approximate the geographic coverage area of the geographic feature;
       determining, for each of the cells, a list of one or more of the plurality of geographic features that include the map cell in its geographic coverage area; and
       scoring each of the one or more of the plurality of geographic features in the list based on an amount of area overlap between the one or more of the plurality of geographic features and the map cell in its geographic coverage area, the score comprising a coverage score based on a search cell area and a covering fraction.

16. The system of claim 15, wherein the processors are further configured to perform operations comprising:
generating a first index associating each of the plurality of geographic features with the one or more map cells that approximate the geographic coverage area of the geographic feature.

17. The system of claim 15, wherein the processors are further configured to perform operations comprising:
generating a second index associating the one or more map cells with at least one of the geographic features in the list based on the score associated with the at least one of the plurality of geographic features.

18. The system of claim 17, wherein the processors are further configured to perform operations comprising:
providing at least one of the plurality of geographic features to a user if the score of the at least one of the plurality of geographic features exceeds a predetermined threshold.

19. The system of claim 15, wherein the processors are further configured to perform operations comprising:
using two or more search cells, corresponding with map cells of different hierarchical levels, to identify two or more political features that are related at different hierarchical levels.

* * * * *